(12) United States Patent
Goldstein et al.

(10) Patent No.: US 6,441,969 B1
(45) Date of Patent: Aug. 27, 2002

(54) PRESCRIPTION MIRROR

(76) Inventors: Leon Goldstein, 2051 W. Farwell, Chicago, IL (US) 60645; Arthur Dorf, 1503 S. Highland, Arlington Heights, IL (US) 60005

( * ) Notice: Subject to any disclaimer, the term of this patent is extended or adjusted under 35 U.S.C. 154(b) by 0 days.

(21) Appl. No.: 09/442,614

(22) Filed: Nov. 18, 1999

(51) Int. Cl.[7] .......................... G02B 17/00; F21V 33/00
(52) U.S. Cl. ...................... 359/727; 359/732; 359/871; 359/726; 362/136; 362/135
(58) Field of Search ................. 359/726, 727, 359/732, 838, 839, 840, 871; 362/135, 136, 137, 138, 140, 142

(56) References Cited

U.S. PATENT DOCUMENTS

| | | | | |
|---|---|---|---|---|
| 1,898,791 A | * | 2/1933 | Schlumbohm | |
| 2,733,637 A | | 2/1956 | Joseph | ............................ 88/96 |
| 2,861,501 A | * | 11/1958 | Strelakos | |
| 2,905,054 A | * | 9/1959 | Logan | |
| 3,006,252 A | * | 10/1961 | Kacowski | |
| 3,374,047 A | | 3/1968 | Gatchell | ..................... 350/199 |
| 3,527,524 A | * | 9/1970 | Pace et al. | |
| 3,610,738 A | | 10/1971 | Bochmann | .................. 350/295 |
| 3,623,793 A | | 11/1971 | Merten et al. | ............... 350/295 |
| 3,623,796 A | | 11/1971 | Schweiger | ................... 350/295 |
| 3,632,191 A | | 1/1972 | Cox | ............................ 350/202 |
| 3,677,620 A | | 7/1972 | Bettencourt | ................. 350/145 |
| 3,887,800 A | * | 6/1975 | Johnson | |
| 3,893,755 A | * | 7/1975 | Cobarg et al. | |
| 3,949,767 A | * | 4/1976 | Rose | |
| 3,970,369 A | | 7/1976 | Wachsman | ................... 350/202 |
| 3,972,600 A | * | 8/1976 | Cobarg | |
| 3,996,947 A | | 12/1976 | Szpur et al. | .................... 132/79 |
| 4,128,310 A | | 12/1978 | Miller | .......................... 350/295 |
| 4,373,789 A | | 2/1983 | Roberts | ....................... 351/158 |
| 4,734,557 A | | 3/1988 | Alfille et al. | ................ 219/121 |
| D331,818 S | | 12/1992 | Holahan et al. | ............. D28/82 |
| 5,349,393 A | * | 9/1994 | Kreft | |
| 5,442,488 A | | 8/1995 | Pastorino | ..................... 359/802 |
| 5,673,153 A | | 9/1997 | Soll et al. | .................... 359/846 |

FOREIGN PATENT DOCUMENTS

GB            025 25 26       *  6/1926   .................. 359/840

* cited by examiner

Primary Examiner—Ricky D. Shafer
(74) Attorney, Agent, or Firm—Banner & Witcoff, Ltd.

(57) ABSTRACT

A common corrective eyeglass lens blank and a common mirror, Plano or magnifying, are brought together in a "compact" (small sized) construction and assembly to provide the very thing long desired in mirrors and not elsewhere found—corrected vision and ample working room between the eyes and any lenses, at the same time, at reasonable cost, in an elegance of implementation.

3 Claims, 5 Drawing Sheets

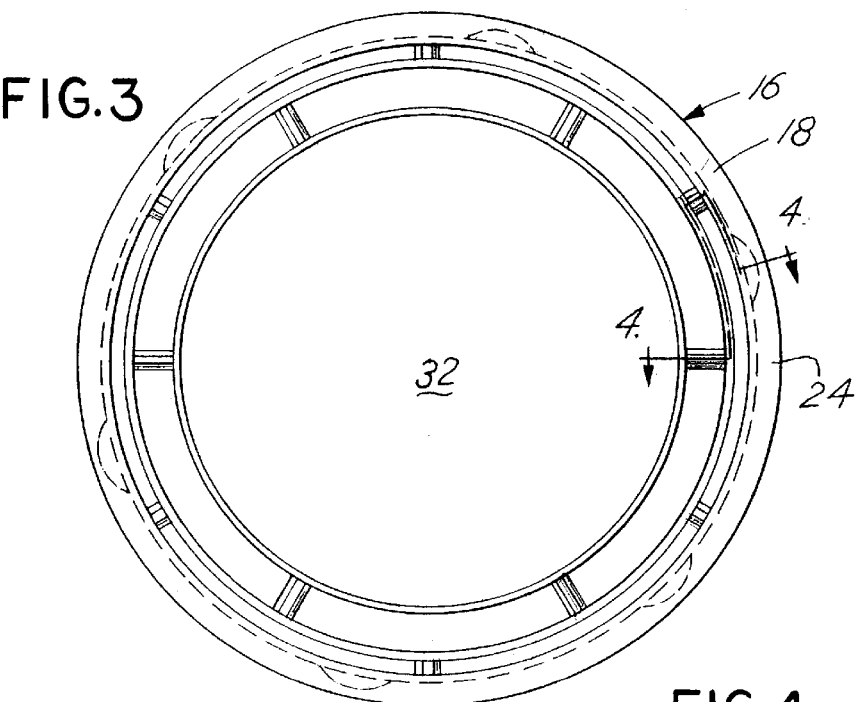
FIG.3
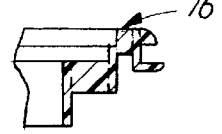
FIG.4
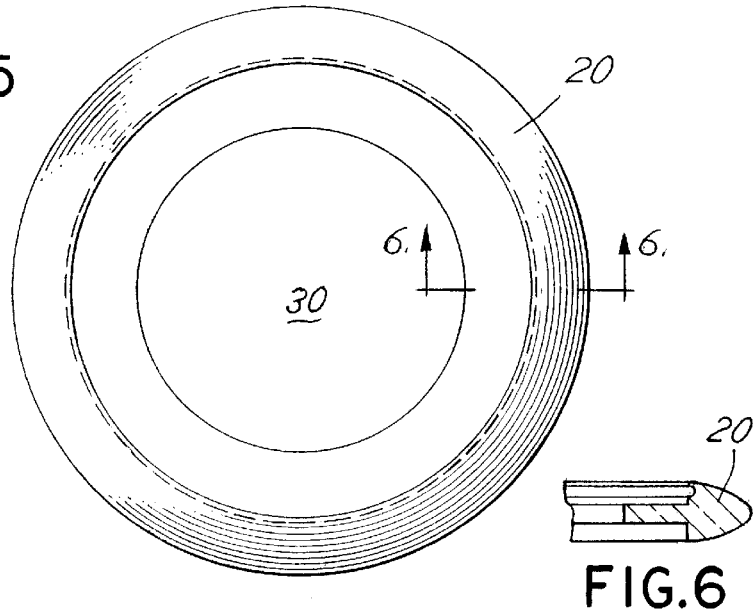
FIG.5
FIG.6

FIG. 9
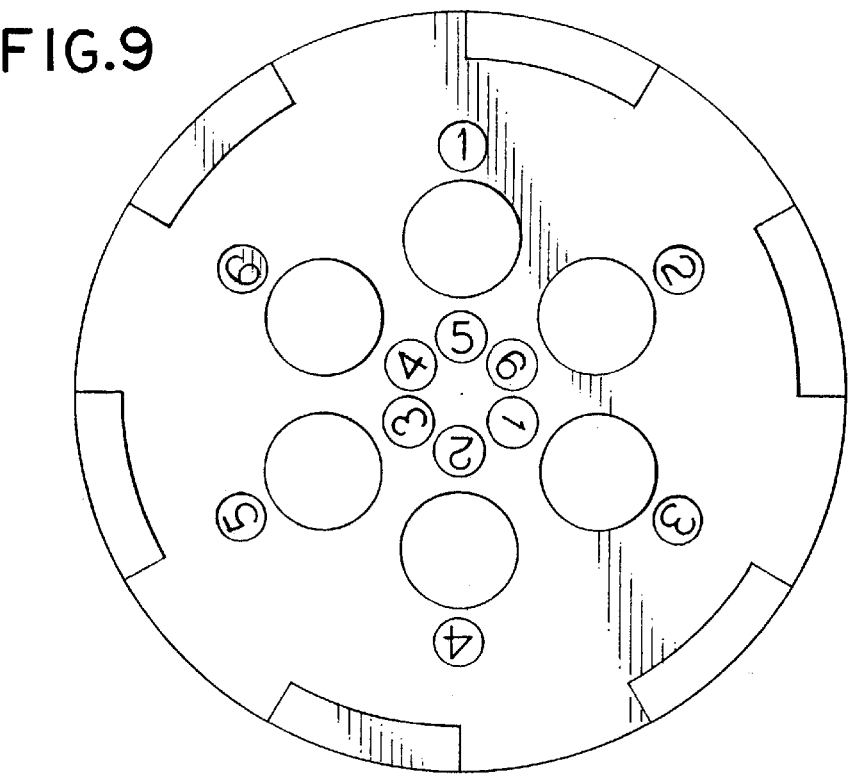
FIG. 10
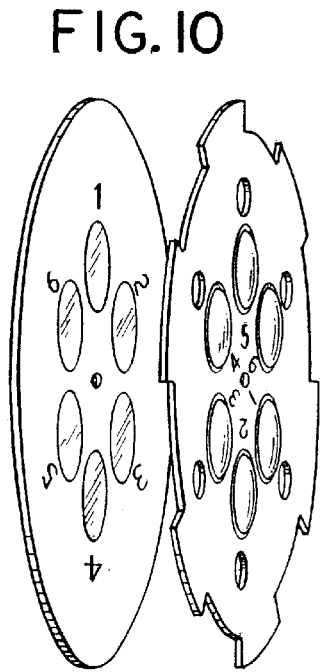
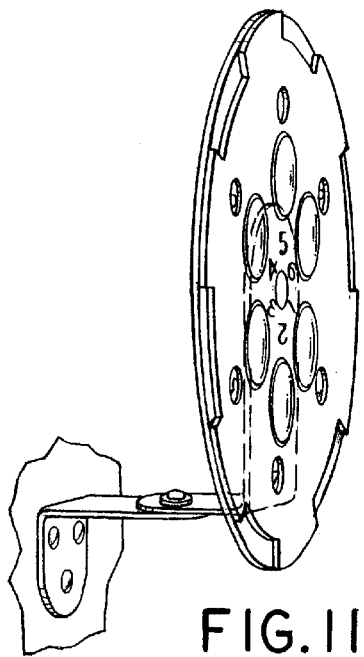
FIG. 11

PRESCRIPTION MIRROR

BACKGROUND OF THE INVENTION

This invention relates to mirrors. This invention especially relates to mirrors with which prescription eyeglass lenses are mounted to provide vision corrected focused images at suitable distances for such tasks as applying cosmetics. Prior art patents of note include: U.S. Pat. No. 2,733,637 to Irwin S. Joseph; U.S. Pat. No. 3,374,047 to Azeline D. Gatchell; U.S. Pat. No. 3,610,738 to Carl E. Bochmann; U.S. Pat. No. 3,623,793 to Barron C. Merten et al.; U.S. Pat. No. 3,623,796 to Jose Schweiger; U.S. Pat. No. 3,632,191 to James E. Cox; U.S. Pat. No. 3,677,620 to Joseph Bettencourt; U.S. Pat. No. 3,970,369 to Phyllis Wachsman; U.S. Pat. No. 3,996,947 to Roman Szpur et al.; U.S. Pat. No. 4,128,310 to John Miller; U.S. Pat. No. 4,373,789 to Lorraine J. Roberts; U.S. Pat. No. 4,734,557 to Jean-Pascal Alfille; U.S. Pat. No. 5,442,488 to Anthony T. Pastorino; U.S Pat. No. 5,673,153 to David B. Soll; U.S. Pat. No. Des. 331,818 to James M. Holahnan et al.

Women frequently complain that although they can see themselves in a mirror with their glasses on, when the glasses are removed in order to apply make-up, their image appears blurred. Until now the only commonly available recourse was to use a magnifying mirror even though the enlarged image was frequently of poor quality. The problem is that all people have different eyes, different refractive errors and different visual needs. People who would not wear someone else's eyeglasses should not have to use someone else's mirror.

Attempts at improving mirrors have been frequent and wideranging. In U.S. Pat. No. 2,733,637, a mirror is set in a case where it is subjected to desired changes in curvature to make its degree of magnification variable. In U.S. Pat. No. 3,374,047, a magnifying lens is put in front of a mirror. In U.S. Pat. No. 3,610,738, as in the '637 patent, a mirror is variable in degree of magnification. The same is true of U.S. Pat. No. 3,623,793 and U.S. Pat. No. 3,623,796.

U.S. Pat. No. 3,632,191 discloses a lady's compact, understood at present to bring a magnifying lens and a non-magnifying mirror together for improved vision. U.S. Pat. No. 3,677,620 is understood at present to improve upon the construction of the '191 patent by disclosing the grinding of the magnifying mirror to the prescription of a specific user. U.S. Pat. No. 3,970,369 criticizes the '620 patent construction as extremely difficult to implement and relatively expensive. The '369 patent then proposes a mirror with the equivalent of eyeglasses put near it. Just as when eyeglasses are on the face, when the eyeglasses are near the mirror as in the '369 patent, the eyeglasses are close to the eyes and the eyes inaccessible.

U.S. Pat. No. 3,996,947 moves to lenses ground to prescription in a general sense, but more specifically, ground to an unusual vertex distance, 128 millimeters, and corrected in power. U.S. Pat. Nos. 4,128,310 and 4,734,557 again provide "zoom" mirrors; U.S. Pat. No. 4,373,789 again provides eyeglasses "on a stick"; and U.S. Pat. Nos. 5,442, 488 and Des. 331,818 again put magnifying lenses with mirrors. Finally, U.S Pat. No. 5,673,153 to David B. Soll provides an assembly that can selectively create optical compound corrections in images.

All these patents are incorporated by reference. All show a longstanding need. None show an adequate mirror-lens combination for the problem women and all people with vision in need of correction face with close-up mirrors when their eyes are not corrected by eyeglasses or contact lenses.

SUMMARY OF THE INVENTION

It is now possible—with the invented optical system—for each person to have their own custom-made mirror. The visual effect is to see one's image as if glasses were on without having glasses on. In fact, for most people, the image they see in the mirror is better than with glasses on since the concave mirror in the invented optical system provides clear enlargement.

To custom-fit the mirror, a refractive prescription is supplied by the individual's Ophthalmologist or Optometrist. This prescription is part of every normal eye examination and entails no extra work for the doctor. In fact, the prescription is identical to the distance vision portion of the refraction. The invented optical system is like a super bifocal. An overlying lens supplies the distance correction (including correction of astigmatism) of the user, and a concave mirror supplies the magnification of the "bifocal add." The invented optical system departs sharply from systems using variable or "zoom" mirrors; systems using common magnifying lenses with mirrors; and systems putting eyeglasses on sticks or other supports to be used close to the eyes with more distant mirrors.

In a preferred embodiment, a non-magnifying corrective lens is adjacent a mirror such that a "working distance" from the lens and mirror combination a focused, corrected, reflected image is created of an object at the working distance. By placing the eyes and face at the working distance, the user for whom the lens is corrective may see the focused, corrected, reflected image of the eyes and face. The user may see the image without having eyeglasses on or contact lenses in. The corrective lens may be a lens from a common eyeglass blank, without special grinding or other special effect. The result is an economical, simple to implement, non-Rube-Goldberg personalized mirror. As desired, the mirror, as opposed to the lens, may be concave and have a magnifying power.

The power of the concave mirror is determined by the doctor and this power depends on the individual's needs and the health of the eyes. For example, a person with macular degeneration would require more magnification.

A distinct advantage of the invented optical system is its simplicity. Standard size eyeglass-quality optical lenses are used as most preferred without additional edging or other special effects. Matching 3 inch diameter magnifying mirrors are employed as most preferred that are readily available in various powers. The whole system, again as most preferred, may literally snap together in less than 2 minutes. Moreover, since the system is modular, in its highest refinement, its parts do not have to be discarded every time there is a change in a person's refraction. A new lens or mirror may be substituted as necessary.

The invention is suitable for at least the following uses: application of eye and face make-up, insertion of contact lenses, removal of superficial foreign bodies from the eye, such as eyelashes, plucking of eyebrows, as a shaving mirror for men, for insertion of eye drops or eye ointments, and as a low vision aid for those with macular degeneration, cataract, glaucoma or diabetic eye disease.

Selection of proper lens correction and mirror power depends on an individual's refractive error and whether eyes are healthy or diseased. The invented optical system accommodates both convex and concave lenses (with or without correction for astigmatism) and accommodates mirrors ranging in power from Plano (no magnification) to about 7× magnification, more or less.

BRIEF DESCRIPTION OF THE DRAWINGS

FIG. 3 is a view taken from the left in FIG. 1 of the face of the mirror.

FIG. 4 is a cross-section detail view taken along line 4—4 of FIG. 3.

FIG. 5 is a rear view of components of the mirror of FIG. 3.

FIG. 6 is a across-section detail view taken along line 6—6 in FIG.5.

FIG. 9 is a view of a selection mechanism for selecting mirror and lens combinations according to the invention.

FIG. 10 is an exploded perspective view of the mechanism of FIG. 10.

FIG. 11 is a view similar to FIG. 10 showing the selection mechanism as mounted for use.

FIG. 13 is a cross-section view taken along line 2—2 in FIG. 1, showing the assembly mounted with a concave or.

DETAILED DESCRIPTION OF THE PREFERRED EMBODIMENT

Figure 1:
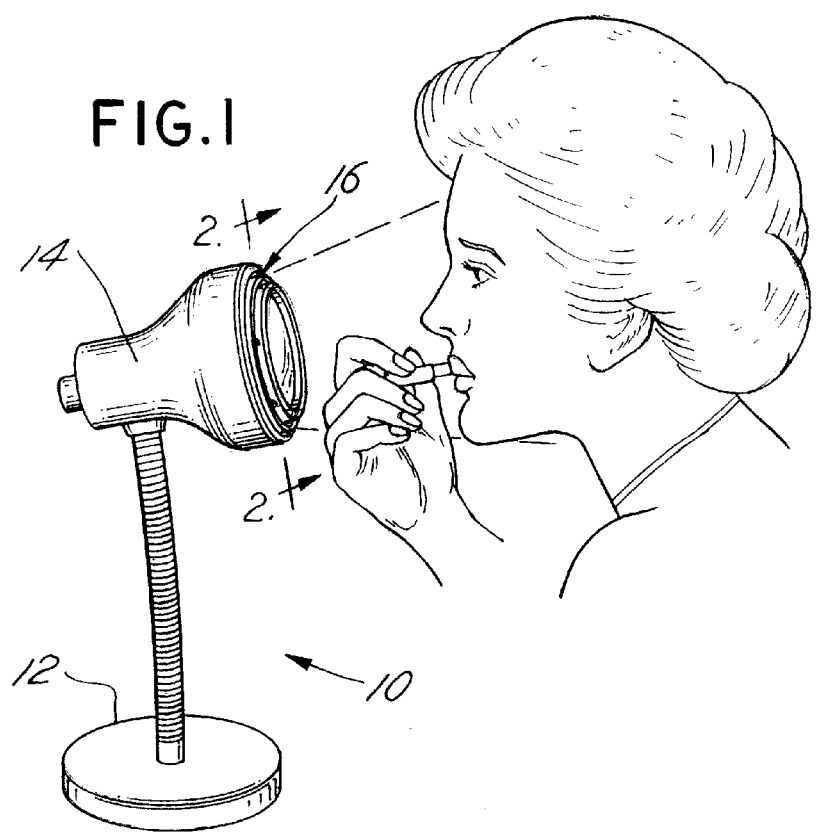
FIG. 1 is a depiction of a woman utilizing one form of the invention, which is preferred and is a lighted mirror adapted to the invention.
Figure 2:
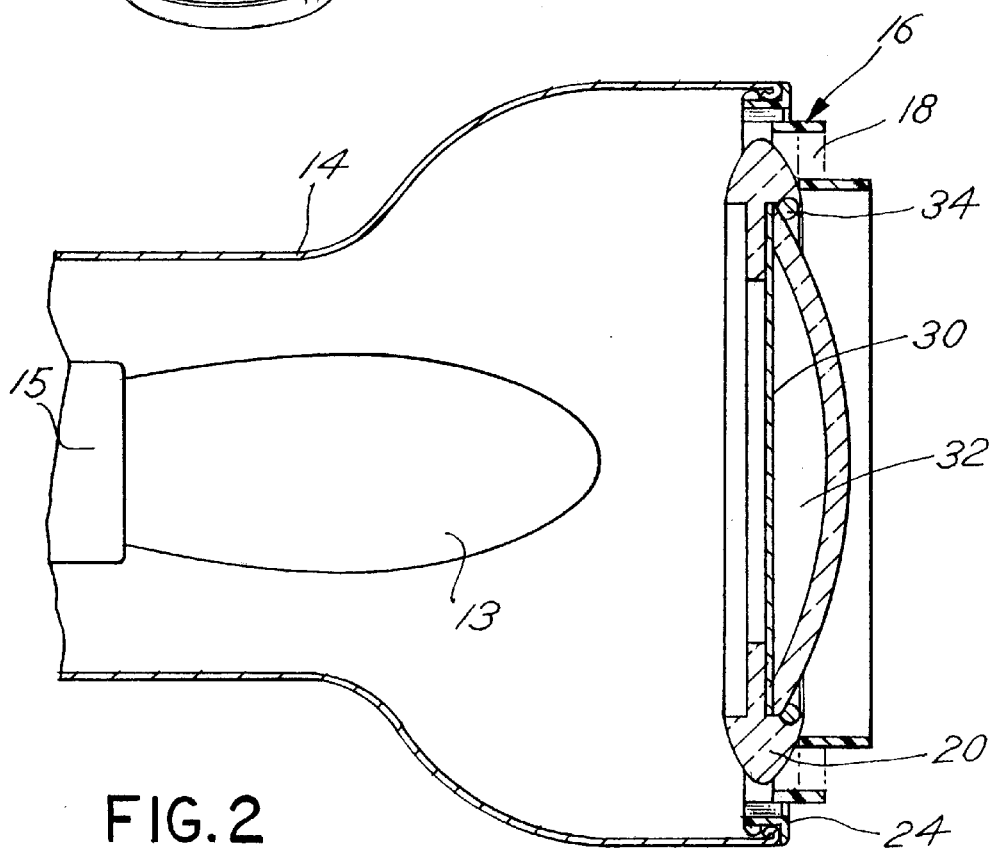
FIG. 2 is a cross section view taken along line 2—2 in FIG. 1

Referring to FIGS. 1–6 and 13, and 7–8 and 12, as groups, the invention is most preferably embodied in two exemplary embodiments. In a first, see FIGS. 1–6 and 13, the invention is fitted into and made a part of a lighted mirror 10. In a second, see FIGS. 7–8 and 12, the invention is fitted into and embodied in a hand-held compact 20. A variety of other alternative embodiments are possible. The two shown here are those currently envisioned by the inventors and which exist in sufficient structural clarity to be illustrated at this time.

To particularize the lighted mirror 10, a stand 12 supports a light bulb 13 in an electrical socket 15 inside a housing 14. A unique corrective mirror assembly 16 is located in the opening of the housing 14. In the assembly 16, the central portion or center of the assembly is occupied by a lens-mirror subassembly, to be described. A support plate 18 includes an inner, circular, lens-mirror base 20. Spokes are placed circumferentially around the base 20 and extend to an outer rim 24. The rim 24 is friction fit in the opening of the light housing 14. Light from the bulb 13 passes through the spaces between the spokes to illuminate the face of the viewer as in FIG. 1, at a working distance.

A mirror 30 or 30' and lens 32 are held in the plate 18 against the base 20. The mirror 30 or 30' has its mirrored face turned outward of the housing 14, toward the user. The back of the mirror is friction fit or loosely fit in the perimeter flange of the base 20. The lens 32 is laid in over the mirror 30 or 30', in this embodiment physically snug against the mirror 30 or 30'. Both the mirror 30 or 30' and lens 32 are held to the base 20 through an O-ring 34 fitted in a groove of the base 20, or through other retaining means, including but not limited to adhesives and other known equivalents, as desired.

The lens 32 is turned backward from normal usage in eyeglasses, with the central portion that projects from the rim of the lens turned toward the user. The lens 32 is most preferably a standard size corrective eyeglass lens blank, having a front surface and a back surface that are generally parallel to each other. The lens is most preferably not a common household magnifying lens, with a flat back surface, or an outwardly bulging back surface. The preferred lens blank is used without edging of the blank beyond that provided by the blank itself. That is, as most preferred, the blank is used as a blank, not as an edge ground lens made from the blank, as occurs in eyeglass manufacture.

The lens is selected from among commonly available blanks, often six in number of such blanks. Selection of the proper corrective lens depends centrally on the user's individual refractive error, with each lighted mirror 10 set for a specific individual user. The lens matches the distance portion of the refraction of the prescription of the normal eye examination of the user. The lens supplies the distance correction (including correction of astigmatism) of the user.

The mirror 30 or 30' is generally a concave mirror. The mirror 30 or 30' adds to the vision correction of the lens 32 the magnification of the mirror 30 or 30'. The power of the mirror is its measure of magnification, and this power is determined by the needs of the individual and the health of the individual's eyes. For those needing less magnification, the mirror 30 or 30' has a low power. For those needing more magnification, the mirror 30 or 30' has a high power. Powers in the range of 2× and 3× are common. Powers may range from plano (no magnification) to about 7× magnification, more or less.

In combination, the corrective lens 32 and a magnifying mirror 30 or 30' provide a beneficial structure in the lighted mirror 10. The face is illuminated at a "working distance" by the light as in FIG. 1. The user is then able to see the user's illuminated face in the mirror 30 or 30', through the lens 32. Since the lens 32 corrects vision for the user, the user sees clearly in the mirror 30 or 30' without eyeglasses. "Working distance" means a distance of approximately one inch to three feet, within which physical tasks may occur such as makeup application to the face.

Figure 7:
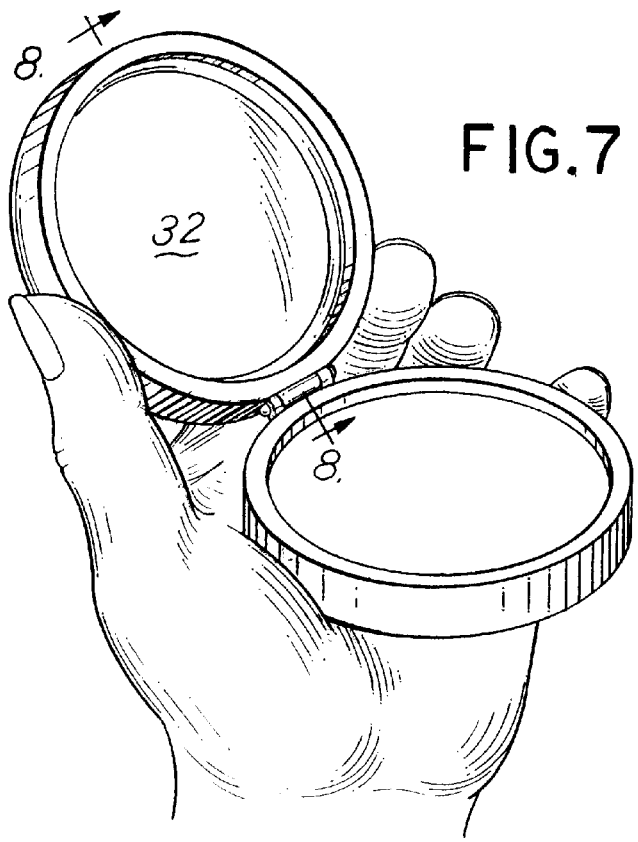
FIG. 7 is a view of a hand-held second embodiment.
Figure 8:
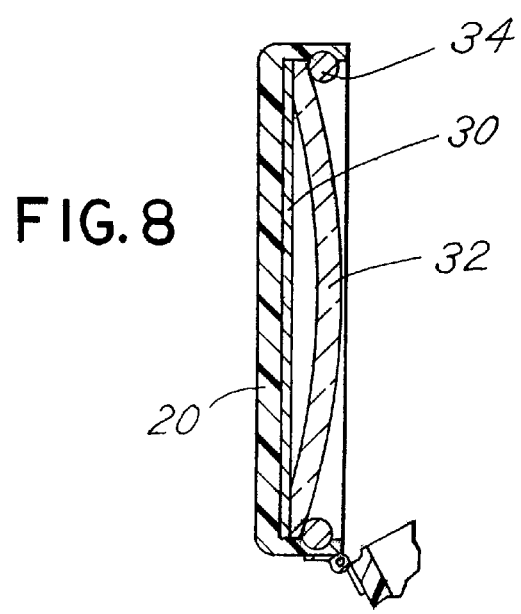
FIG. 8 is a cross-section view taken along line 8—8 in FIG. 7.

Referring to FIGS. 7–8, equivalent structure, insofar as important, is found in the compact 20. The compact 20 is equivalent to the base 20 of the lighted mirror 10 in holding a mirror 30 or 30' and a lens 32. Vision is corrected and vision provided to those needing eyeglasses, without eyeglasses being present on or adjacent the face, at a working distance from the compact 20.

In relation to some more specific details of the compact 20, and to more specific details of the lighted mirror 10 in an equivalent way, the location of a locking ring groove in the case of the compact, i.e., its distance from the back wall of the compact 30 or 30', varies depending on the edge thickness of the lens-mirror combination. Lens-mirror combinations with thicker edge thickness require a locking ring groove for the O-ring 34 more distant from the back wall of the compact 20 than lens-mirror combinations with thinner edge thickness.

The invented model of compact 20 is designed to accept any one of standard 70 mm diameter lenses. However, lenses ranging in diameter from 66 mm to 76 mm would also fit this model. Smaller lenses would require a wider diameter O-ring. Conversely, lenses approaching the 3" diameter of the preferred mirror could be secured with a narrower locking ring.

The most preferred case is plastic. The "transverse" height (the thickness) of the plastic case, i.e., the thickness from the back wall to the front surface of the lens 32, will depend upon lens power. High power convex lenses usually have a high curve. Case thickness will also depend on whether the invented optical system is correcting one or both eyes. If only one eye is being corrected, the other half of the case may contain a Piano mirror or a light source, also perhaps secured with a locking ring. If two eyes are being corrected, differently, the other half of the case may have the other corrective lens and mirror for the other eye.

Figure 12:
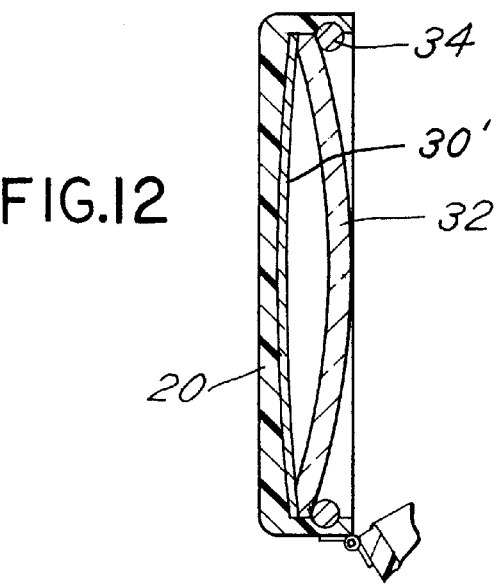
FIG. 12 is a cross-section view taken line 8—8 in FIG. 7, showing the assembly mounted with a concave mirror.
Figure 13:
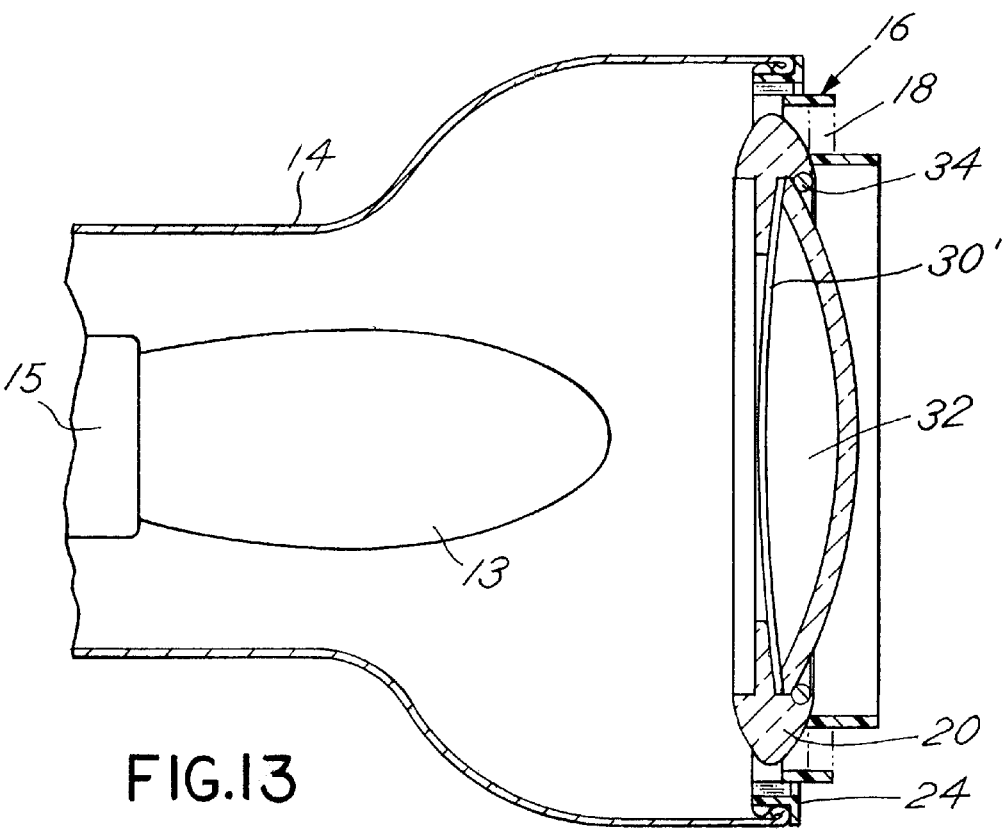

Though a compact design was chosen for the model of FIGS. 7–8 and 12, there is no theoretical limit to the size of the lens-mirror combination available in practicing the invention. Larger diameter combinations (e.g. 9"–12") could be wall-mounted and medium diameter combinations (e.g. 5"–7") could be secured to a stand. In addition, all models—including the compact plastic case—could have self-contained lighting, as in the lighted mirror 10.

As reflected by the disclosure, a common eyeglass blank and a common mirror, Plano or magnifying, may be brought together in a "compact" (small sized) construction and assembly to provide the very thing long desired in mirrors and not elsewhere found corrected vision and ample working room between the eyes and any lenses, at the same time, at reasonable cost, in an elegance of implementation. Deficiences of the prior art are overcome.

The preferred embodiments of the invention are now described in such full, clear, concise and exact terms as to enable a person of ordinary skill in the art to make and use the invention. To particularly point out and exactly claim the subject matter regarded as invention, the following claims conclude this specification.

As a last point, given the limited number of corrective eyeglass lens blanks and powers of mirrors that resolve the needs of most potential users, a wheel for selection of lens blank and mirror power combinations may be provided as in FIGS. 9–10. Lenses may be on one wheel, and mirrors on the other. The lenses and mirrors may be individually marked for reading of the markings. By rotating the wheels relative to each other around a common central pivot, a potential user may bring a desired blank and a desired mirror into alignment. The user can then adequately select the desired lens-mirror components from a supply, or adequately report a desired selection to an eyecare professional. For example, if the lens blanks are marked 1 through 6, and the mirrors marked 1 through 6, the user may remember a "2–3" or a "1–5," etc., combination of lens and mirror suits them.

What is claimed:

1. An assembly comprising:

a lens from a corrective eyeglass lens blank; and a magnifying mirror;

the lens adjacent and fitted against the mirror such that at a working distance from the lens and mirror a focused, corrected, reflected image is created of an object at the working distance, the lens being turned backward from normal usage in eyeglasses, and the lens and mirror being centered on each other.

2. An assembly as in claim 1, embodied in a lighted mirror.

3. An assembly as in claim 1, embodied in a lady's compact.

\* \* \* \* \*